United States Patent
Blainey et al.

(10) Patent No.: US 9,268,598 B2
(45) Date of Patent: Feb. 23, 2016

(54) RECORDING AND PROFILING TRANSACTION FAILURE SOURCE ADDRESSES AND STATES OF VALIDITY INDICATOR CORRESPONDING TO ADDRESSES OF ABORTED TRANSACTION IN HARDWARE TRANSACTIONAL MEMORIES

(75) Inventors: Robert J. Blainey, Ontario (CA); Harold W. Cain, Katonah, NY (US); Susan E. Eisen, Round Rock, TX (US); Bradly G. Frey, Austin, TX (US); Charles B. Hall, Alberta (CA); Hung Q. Le, Austin, TX (US); Cathy May, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 13/615,416

(22) Filed: Sep. 13, 2012

(65) Prior Publication Data

US 2014/0075441 A1    Mar. 13, 2014

(51) Int. Cl.
G06F 9/46    (2006.01)
G06F 11/14    (2006.01)
G06F 11/36    (2006.01)

(52) U.S. Cl.
CPC .......... *G06F 9/467* (2013.01); *G06F 11/1474* (2013.01); *G06F 11/3648* (2013.01); *G06F 11/36* (2013.01)

(58) Field of Classification Search
CPC ........ G06F 9/46; G06F 9/467; G06F 11/1474

USPC .......... 718/101; 711/154, 150, E12.001, 147; 707/703; 714/E11.131
See application file for complete search history.

(56) References Cited

U.S. PATENT DOCUMENTS

| | | | | |
|---|---|---|---|---|
| 5,881,077 A | * | 3/1999 | Densham | G06F 11/10 714/704 |
| 6,550,056 B1 | * | 4/2003 | Mizumoto et al. | 717/124 |
| 7,013,456 B1 | | 3/2006 | Van Dyke et al. | |
| 7,321,988 B2 | | 1/2008 | Guo et al. | |
| 7,350,034 B2 | * | 3/2008 | Shen | 711/145 |
| 7,409,587 B2 | | 8/2008 | Perry | |

(Continued)

FOREIGN PATENT DOCUMENTS

JP    2011164730    8/2011

OTHER PUBLICATIONS

Dave Dice et al., Early Experience with a Commercial Hardware Transactional Memory Implementation, Oct. 2009, 60 pages.

(Continued)

*Primary Examiner* — Abdullah Al Kawsar
*Assistant Examiner* — Abu Z Ghaffari
(74) *Attorney, Agent, or Firm* — Russell Ng PLLC; Parashos Kalaitzis

(57) ABSTRACT

A processor core includes a transactional memory, a transaction failure instruction address register (TFIAR), and a transaction failure data address register (TFDAR). The transactional memory stores information of a plurality of transactions executed by the processor core. The processor core retrieves instruction and data address associated with the aborted transaction from TFIAR and TFDAR respectively and stores them into a profiling table. The processor core then generates profiling information based on instruction and data addresses associated with the aborted transaction.

10 Claims, 3 Drawing Sheets

(56) References Cited

U.S. PATENT DOCUMENTS

| | | |
|---|---|---|
| 7,617,421 B2 | 11/2009 | Caprioli et al. |
| 8,180,980 B2 | 5/2012 | Biles et al. |
| 8,225,139 B2 | 7/2012 | Nussbaum et al. |
| 2003/0212805 A1* | 11/2003 | Motosaka et al. ............ 709/228 |
| 2006/0047925 A1* | 3/2006 | Perry .................. G06F 11/1474 711/162 |
| 2006/0168485 A1 | 7/2006 | Jusufovic et al. |
| 2008/0133518 A1* | 6/2008 | Kapoor et al. ................... 707/6 |
| 2008/0141224 A1* | 6/2008 | Kawasaki et al. ............ 717/127 |
| 2010/0332901 A1 | 12/2010 | Nussbaum et al. |
| 2011/0145552 A1* | 6/2011 | Yamada .............. G06F 9/30076 712/228 |
| 2011/0154110 A1 | 6/2011 | Letz et al. |
| 2012/0005461 A1 | 1/2012 | Moir et al. |
| 2012/0030518 A1 | 2/2012 | Rajwar et al. |
| 2013/0283115 A1* | 10/2013 | Sazeides et al. .............. 714/752 |

OTHER PUBLICATIONS

Goetz Graefe and Harumi Kuno, Definition, Detection, and Recovery of Single-Page Failures, a Fourth Class of Database Failures, 10 pages.

* cited by examiner

RECORDING AND PROFILING TRANSACTION FAILURE SOURCE ADDRESSES AND STATES OF VALIDITY INDICATOR CORRESPONDING TO ADDRESSES OF ABORTED TRANSACTION IN HARDWARE TRANSACTIONAL MEMORIES

BACKGROUND

The present invention relates generally to computer systems. More particularly, the present invention relates to hardware transactional memories in computer systems.

In computer systems, parallel or concurrent programming can be implemented in form of transactions that involve executing a set of instructions in an atomic and isolated manner. A programmer can specify a group of instructions as a transaction for execution thereof. In atomic execution, either all instructions of the transaction are executed as a single atomic block, or none are executed. For instance, in case of a transaction that includes ten instructions executing sequentially, if an error occurs at the fifth instruction and an abort condition is encountered, the first through fourth instructions which have already been executed are also aborted along with the remaining instructions. The architecture of the computer system is also restored to its original state, when the transaction is aborted. Restoring the architecture of the computer system involves restoring contents of all registers and memory blocks used during the execution of the transaction.

Transactional execution helps in managing shared memory access of transactional memories in a parallel programming environment. Transactional execution can be implemented in two ways—by using a hardware transactional memory (HTM) and by using a software transactional memory (STM). HTM is implemented in the processor hardware and a transaction using HTM is committed to a system memory only after the transaction is completed. STM is implemented in software and intermediate results generated during the execution of the transaction, along with the final results of the transaction are stored in the system memory, before the transaction is committed. Once the transaction is executed, the results of the transaction that are already stored in the system memory are marked as committed. HTM transactions are increasingly being used because of quicker turnaround times and fewer storage requirements.

In case of a computer system executing a transaction using HTM, if the transaction aborts due to an error in one instruction, detecting the source of the error is important to debug the transaction. In HTM, the transaction is committed only after the completion of the execution and therefore no intermediate values are available to analyze the source of the error. Lack of explicit information about the error and its context in the transaction makes it difficult to debug large transactions.

It would be desirable to record information about the source and cause of the error in the transaction, so that programmers can be provided with a context of the error to debug the transaction. This would be helpful to the programmers in debugging the transaction, especially in debugging large transactions. It would also be helpful to use the context of the error to generate profiling information about instructions and memory locations that cause the error. For instance, a memory location involved in a plurality of transaction failures can be spotted and the number of errors, along with the type of errors with respect to the memory location can be generated. The generated profiling information can be used to identify the cause of the plurality of errors in the memory location.

Therefore, it would be advantageous to have a system and method for recording information about the aborted transaction, which generates profiling information associated with the aborted transaction.

BRIEF SUMMARY

In an embodiment of the present invention, a processing core is provided. The processing core includes a transactional memory that stores information of a plurality of transactions executed by the processing core. The processing core further includes an instruction address register for storing the instruction address associated with each of a plurality of aborted transactions and a data address register for storing the data address associated with each of the plurality of aborted transactions. The processor core is configured for retrieving the instruction and data addresses of the plurality of aborted transactions from the instruction address register and the data address register, respectively. Profiling information associated with the aborted transaction based on the retrieved instruction and data addresses is then generated.

BRIEF DESCRIPTION OF THE SEVERAL VIEWS OF THE DRAWINGS

The features of the present invention, which are believed to be novel, are set forth with particularity in the appended claims. Embodiments of the present invention will hereinafter be described in conjunction with the appended drawings provided to illustrate and not to limit the scope of the claims, wherein like designations denote like elements, and in which:

DETAILED DESCRIPTION

Figure 1:
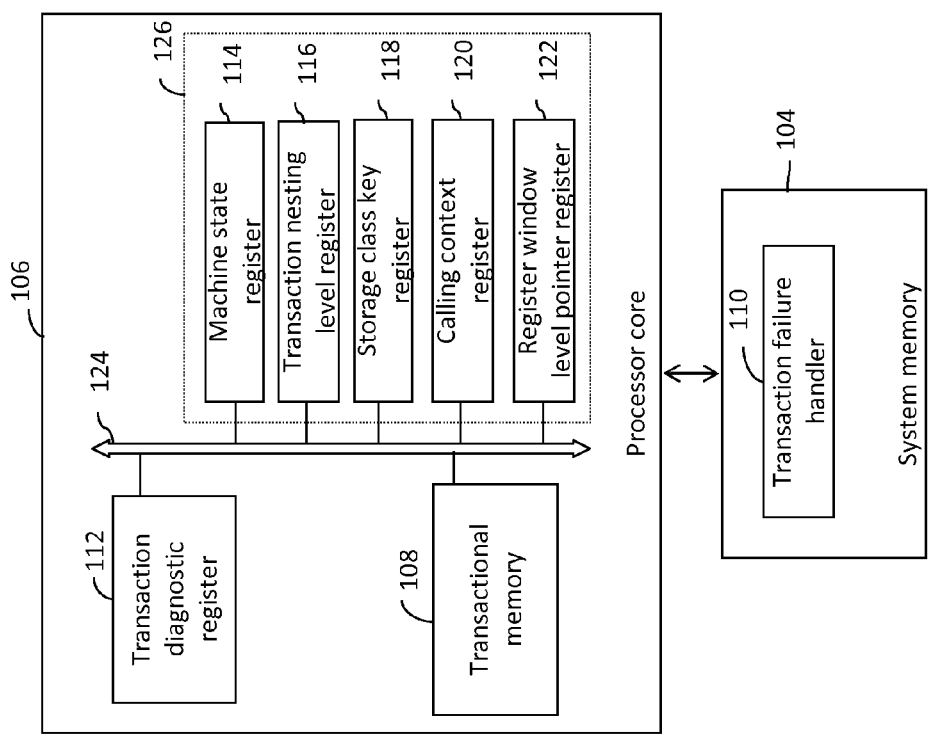
FIG. 1 is a schematic block diagram of a system for recording and profiling an aborted transaction, in accordance with an embodiment of the present invention.

As used in the specification and claims, the singular forms "a", "an" and "the" include plural references unless the context clearly dictates otherwise. For example, the term "an article" may include a plurality of articles unless the context clearly dictates otherwise.

There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of method steps and system components related to computer-implemented method recording and profiling an aborted transaction of a plurality of transactions executed by a processing unit. Accordingly, the system components and the method steps have been represented where appropriate by conventional symbols in the drawings, showing only specific details that are pertinent for an understanding of the present invention so as not to obscure the disclosure with details that will be readily apparent to those with ordinary skill in the art.

While the specification concludes with the claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Referring now to FIG. 1, a schematic block diagram of a system 100 for recording and profiling an aborted transaction, in accordance with an embodiment of the present invention, is shown. The system 100 includes a processor core 106 that is in communication with a system memory 104. The processor core 106 includes a transactional memory 108, a transaction failure handler 110, a transaction diagnostic register 112, and a system interconnect 118. The processor core 106 further includes a transaction failure data address register (TFDAR) 114 and a transaction failure instruction address register (TFIAR) 116.

The system interconnect 118 may be implemented, for example, as a bused interconnect, a switched interconnect or a hybrid interconnect. The system memory 104 may be implemented as a static RAM (SRAM), a dynamic RAM (DRAM), a FLASH memory or a virtual memory on disk.

A skilled artisan will appreciate that in various implementations of the transactional memory 108, the transactional memory 108 may include a store-through level one (L1) cache and a respective store-in level two (L2) cache for each processor core 106. In order to efficiently handle multiple concurrent memory access requests to cacheable addresses, each L2 cache can be implemented with multiple L2 cache slices, each of which handles memory access requests for a respective set of real memory addresses. Additional levels (L3, L4, etc.) of on-chip or off-chip, private or shared, in-line or lookaside cache, which may be fully inclusive, partially inclusive, or non-inclusive of the contents of the L1 and L2 cache memories, may also be a part of the transactional memory 108.

The system 100 of FIG. 1 may include many additional non-illustrated components, such as interconnect bridges, non-volatile storages, ports for connection to networks or attached devices, etc. Because such additional components are not necessary for an understanding of the described embodiments, they are not illustrated in FIG. 1 or discussed further herein. It should also be understood, however, that the enhancements described herein are applicable to systems of diverse architectures and are in no way limited to the generalized system architecture illustrated in FIG. 1.

The transactional memory 108, in addition to memory storage also includes a control logic (hereinafter referred to as the TM logic) that coordinates execution of multiple transactions in the transactional memory 108. The TM logic controls the sequencing of a transaction and provides a pass/fail indication and an optional transaction killed indication to the processor core 106. Pass/fail indication indicates to the processor core 106, whether or not the transaction successfully committed to the transactional memory 108, on completion. TM kill indication indicates to the processor core 106 whether or not a conflict has occurred during the transaction. In response to TM logic asserting TM kill indication for the transaction, the processor core 106 may, as a performance optimization, optionally abort the transaction or restart the execution of the transaction.

In response to the pass/fail indication (or optionally the TM kill indication) indicating that a conflict has occurred during execution of the transaction (hereinafter referred to as the aborted transaction), the architecture of the processing unit 102 is restored to its original state. It should be noted that the aborted transaction may be detected using various other detection methods known in the art, and it does not restrict the scope of the present invention in any way.

After detecting the aborted transaction, the processor core 106 stores an instruction address associated with the aborted transaction in to the TFIAR 116. Similarly, the processor core 106 also stores a data address associated with the aborted transaction into the TFDAR 114. The transaction failure handler 110 then retrieves the instruction address associated with the aborted transaction from TFIAR 116 and stores it into a profiling table stored in the transactional memory 108. In another embodiment of the present invention, the profiling table is stored in the system memory 104. Similar process is repeated for the data address associated with the aborted transaction. The transaction failure handler 110 retrieves the data address associated with the aborted transaction from TFDAR 114 and stores it into the profiling table.

Once information associated with the aborted transaction is recorded into the profiling table, the processor core 10 generates several profiles based on the instruction address and data address associated with the aborted transaction stored in to the profiling table.

For example, table A shows a sample report generated by the system of the present invention, by profiling information associated with the aborted transaction. Function name column includes the name of a function in which the conflict associated with the aborted transaction is detected. Event count gives the number of conflicts detected from the function. Filename gives the name of the file that stores the function. Instruction address refers to the specific address of the function from which the conflict associated with the aborted transaction arises. The instruction address Fe90 of the function mainGtU stored in the file blocksort.c has resulted in conflict on 534 instances. Similarly, the instruction address f4b0 of the function .fallbackSort stored in the file blocksort.c has resulted in conflicts on 416 instances. Different profiles based on the precise and imprecise tables can be generated depending on whether the exact address that caused the abort can be determined, as will be subsequently explained.

TABLE A

A report generated by profiling information associated with the aborted transaction

| Function Name | Event Count | Filename | Instruction address |
|---|---|---|---|
| .mainGtU | 534 | blocksort.c | fe90 |
| .fallbackSort | 416 | blocksort.c | f4b0 |

In an embodiment of the present invention, based on a sampling value, the transaction failure handler 110 periodically retrieves the instruction and data addresses associated with the aborted transaction, based on a user specified frequency and stores them into the profiling table. For instance, for a user specified frequency of 4, information of every fourth aborted transaction of a plurality of aborted transactions would be recorded into the profiling table. The instruction and data addresses associated with the plurality of aborted transactions are later used for generating profiling information of the plurality of aborted transactions.

In another embodiment of the present invention, information about the aborted transaction including a cause of the failure associated with the aborted transaction and instruction and data addresses associated with the aborted transaction are stored in to the transaction diagnostic register 112, by the processor core 106.

Figure 2:
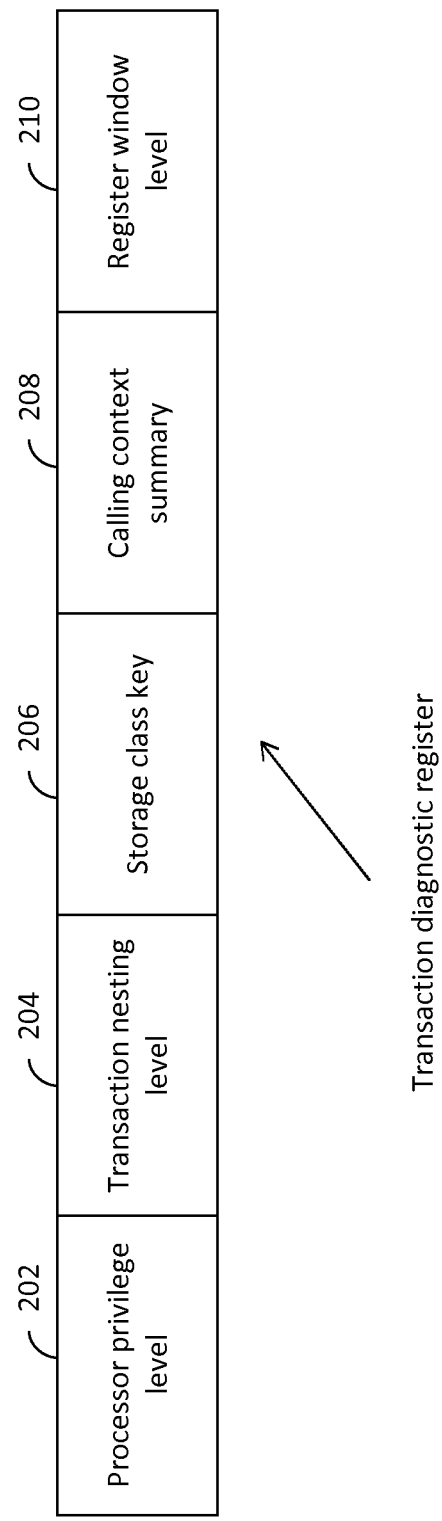
FIG. 2 is schematic diagram of a transaction diagnostic register, in accordance with an embodiment of the present invention.

Referring now to FIG. 2, a schematic diagram of the transaction diagnostic register 112, in accordance with an embodiment of the present invention, is shown. FIG. 2 is explained in conjunction with FIG. 1. The transaction diagnostic register 112 includes a transaction failure field 202, an instruction validity bit 204 and a data validity bit 206 corresponding to the aborted transaction. The failure cause field 202 indicates the cause of the failure associated with the aborted transaction and is loaded by the TM logic. The instruction validity bit 204 indicates whether the instruction address stored in the TFIAR 116 corresponds to a specific instruction of the aborted transaction or another instruction associated with the aborted transaction. The specific instruction associated with the aborted transaction refers to an instruction in the aborted transaction that caused the transaction to be aborted.

If the instruction validity bit 204 is set, the TFIAR 116 stores the instruction address associated with the specific abort-causing instruction associated with the aborted transaction. If the instruction validity bit 204 is reset, TFIAR 116 stores the instruction address of another instruction associated with the aborted transaction.

Similarly, the data validity bit 206 of the transaction diagnostic register 112 indicates whether a data address stored in the TFDAR 114 is a data address of the specific abort-causing instruction or of another instruction associated with the aborted transaction. If the data validity bit 206 is set, the TFDAR 114 stores the data address of the specific abort-causing instruction associated with the aborted transaction. If the data validity bit 206 is reset, TFDAR 114 stores the data address of another instruction associated with the aborted transaction.

Upon detecting the conflict associated with the aborted transaction, the TM logic stores the cause of the failure into the transaction failure field 202 of the transaction diagnostic register 112 and checks if the instruction address of the abort-causing instruction is identified. If the instruction address of the abort-causing instruction is identified, the processor core 106 sets the instruction validity bit of the transaction diagnostic register 112 and stores the instruction address of the abort-causing instruction in to the TFIAR 116. If the instruction address of the abort-causing instruction is not identified, the processor core 106 resets the instruction validity bit 204 and stores the instruction address of another instruction associated with the aborted transaction in to the TFIAR 116.

Similarly, the processor core 106 checks if the data address of the abort-causing instruction is identified. If the data address of the abort-causing instruction is identified, the processor core 106 sets the data validity bit 204 of the transaction diagnostic register 112 and stores the data address of the abort-causing instruction in to the TFDAR 114. If the data address of the abort-causing instruction is not identified, the processor core 106 resets the data validity bit 206 and stores the data address of another instruction associated with the aborted transaction in to the TFDAR 114.

The processor core 106 then invokes the transaction failure handler 110 which checks the instruction validity bit 204 of the transaction diagnostic register 112. If the instruction validity bit is set, the transaction failure handler 110 retrieves the instruction address of the abort-causing instruction from TFIAR 116 and stores it into a precise profiling table stored in the transactional memory 108. In another embodiment of the present invention, the precise profiling table is stored in the system memory 104. If the instruction validity bit is reset, the transaction failure handler 110 retrieves the instruction address of the another instruction associated with the aborted transaction from the TFIAR 116 and stores it into an imprecise profiling table stored in the transactional memory 108. In another embodiment of the present invention, the imprecise profiling table is stored in the system memory 104.

If the data validity bit 206 is set, the transaction failure handler 110 retrieves the data address of the abort-causing instruction from the TFDAR 114 and stores it into the precise profiling table. If the data validity bit 206 is reset, the transaction failure handler 110 retrieves data address of another instruction associated with the aborted transaction from TFDAR 114 and stores it into the imprecise profiling table. The instruction and data addresses associated with the aborted transaction can then be used to generate profiling information as described above.

In a preferred implementation of the present invention, the transaction failure handler 110 retrieves the instruction and data addresses of an instruction that is subsequent to the abort-causing instruction.

The above mentioned process is repeated for a plurality of aborted transactions. Based on the instruction and data addresses associated with the plurality of aborted transactions, profiling information is generated.

Figure 3:
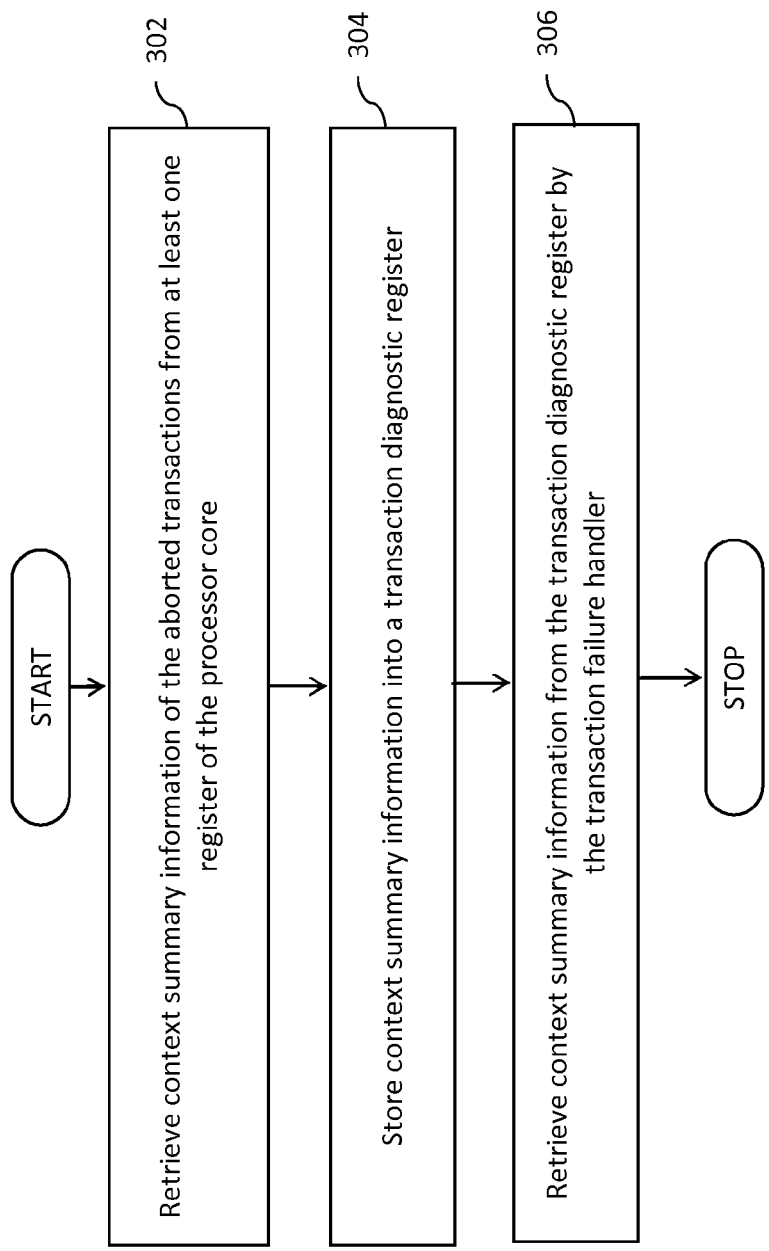
FIG. 3 is a flowchart depicting a method for recording and profiling an aborted transaction, in accordance with an embodiment of the present invention.

Referring now to FIG. 3, a flowchart depicting a method for recording and profiling an aborted transaction of a plurality of transactions, in accordance with an embodiment of the present invention, is shown. The steps of the flowchart of FIG. 3 are explained in conjunction with FIG. 1. At step 302, the instruction and data addresses associated with the aborted transaction are retrieved from the TFIAR 116 and the TFDAR 114. At step 304, the retrieved data and instruction addresses associated with the aborted transaction are stored into the transactional memory 108. In an alternative embodiment, the retrieved data and instruction addresses associated with the aborted transaction are stored into the system memory 104. At step 306, the processor core 106 generates profiling information based on the instruction address and data address associated with the aborted transaction, stored in the profiling table. Thus information associated with the aborted transaction is recorded and profiled by the processing unit, which is later used by a programmer to debug the aborted transaction.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor core comprising:
   a transactional memory that stores information corresponding to a plurality of atomic memory transactions executed by the processor core, wherein the transactional memory includes transactional memory logic that, for each of a plurality of aborted transactions among the plurality of atomic memory transactions, generates a respective one of a plurality of indications that an abort-causing conflict has occurred during execution of one of the plurality of aborted transactions;
   an instruction address register for recording instruction addresses of abort-causing and approximate abort-causing instructions, wherein the instruction address register, responsive to each of the plurality of indications generated by the transactional memory logic, records a respective instruction address for each of the plurality of aborted transactions, wherein for at least some of the plurality of aborted transactions, the instruction address recorded in the instruction address register is that of an abort-causing instruction and, for at least some of the plurality of aborted transactions, the instruction address recorded in the instruction address register is that of an approximate abort-causing instruction in the aborted transaction different than and following the abort-causing instruction;
   a transaction diagnostic register that, responsive to each of the plurality of indications generated by the transactional memory logic, records a first validity indication associated with a respective one of the plurality of aborted transactions, wherein the processor core indicates, via a first state of the first validity indication, that the instruction address recorded in the instruction address register is that of an abort-causing instruction, and indicates, via a second state of the first validity indication, that the instruction address recorded in the instruction address register is that of an approximate abort-causing instruction;
   a data address register for recording data addresses of abort-causing and approximate abort-causing instructions;
   a second validity indication associated with the second address register that indicates, via first and second states of the second validity indication, whether a data address recorded in the data address register is that of an abort-causing instruction or an approximate abort-causing instruction in the aborted transaction, respectively;
   wherein the processor core is configured to:
   retrieve the addresses corresponding to each of the plurality of aborted transactions from the instruction and data address registers; and
   generate profiling information of the plurality of aborted transactions based on the retrieved addresses and the validity indications.

2. The processor core of claim 1, wherein the processor core is further configured to store addresses of abort-causing instructions in a first profiling data structure and to store addresses of approximate abort-causing instructions in a separate second profiling data structure.

3. The processor core of claim 1, wherein the processor core is further configured to periodically retrieve the addresses from the instruction and data address registers for profiling based on a user-specified frequency.

4. The processor core of claim 1, wherein the profiling information includes:
   identifying information regarding a function in which the abort-causing conflict occurred; and
   an event count indicating a number of conflicts detected in the function.

5. The processor core of claim 1, wherein the transactional memory comprises a lower level cache memory.

6. A computer program product for use with a computer for recording and profiling information of a plurality of aborted transactions among a plurality of atomic memory transactions executed by a processing core, wherein the processing core includes an instruction address register, a data address register, a transaction diagnostic register, and a transactional memory, wherein the transactional memory includes transactional memory logic that, for each of a plurality of aborted transactions among the plurality of atomic memory transactions, generates a respective one of a plurality of indications that an abort-causing conflict has occurred during execution of one of the plurality of aborted transactions, the computer program product comprising:
   a non-transitory computer-readable storage device; and
   program code, stored within the computer-readable storage device, that when executed causes the processor core to perform:
   in response to each of the plurality of indications generated by the transactional memory logic, recording, in the instruction address register, a respective instruction address for each of the plurality of aborted transactions, wherein for at least some of the plurality of aborted transactions, the instruction address recorded in the instruction address register is that of an abort-causing instruction and, for at least some of the plurality of aborted transactions, the instruction address recorded in the instruction address register is that of an approximate abort-causing instruction in the aborted transaction different than and following the abort-causing instruction;
   in response to each of the plurality of indications generated by the transactional memory logic, recording, in the transaction diagnostic register, a first validity indication associated with a respective one of the plurality of aborted transactions, wherein the transaction diagnostic register indicates, via a first state of the first validity indication, that the instruction address recorded in the instruction address register is that of an abort-causing instruction in the aborted transaction, and indicates, via a second state of the first validity indication, that the instruction address recorded in the instruction address register is that of an approximate abort-causing instruction;
   in response to each of the plurality of indications generated by the transactional memory logic, recording, in the data address register, a respective data address for each of the plurality of aborted transactions, wherein for at least some of the plurality of aborted transactions, the data address recorded in the data address register is that of an abort-causing instruction and, for at least some of the plurality of aborted transactions, the data address recorded in the data address register is that of an approximate abort-causing instruction;
   in response to each of the plurality of indications generated by the transactional memory logic, recording, in the transaction diagnostic register, a second validity indication associated with the second address register that indicates, via first and second states of the second validity indication, whether a data address recorded in the second address register is that of an abort-causing instruction or an approximate abort-causing instruction in the aborted transaction, respectively;

retrieving the addresses corresponding to each of the plurality of aborted transactions from the instruction and data address registers; and generating profiling information of the plurality of aborted transactions based on the retrieved addresses and the validity indications.

7. The computer program product claim 6, wherein the program code, when executed, causes the processor core to perform:

storing the addresses of abort-causing instructions in a first profiling data structure and storing the addresses of approximate abort-causing instructions in a separate second profiling data structure.

8. The computer program product claim 6, wherein the program code, when executed, causes the processor core to perform:

periodically retrieving addresses from the instruction and data address registers for profiling based on a user-specified frequency.

9. The computer program product of claim 6, wherein the profiling information includes:

identifying information regarding a function in which the abort-causing conflict occurred; and an event count indicating a number of conflicts detected in the function.

10. The computer program product of claim 6, wherein the transactional memory comprises a lower level cache memory.

* * * * *